United States Patent [19]
Jamison

[11] 3,744,873
[45] July 10, 1973

[54] APPARATUS FOR MAINTAINING DETECTING DEVICES FREE OF CONTAMINANTS

[75] Inventor: Will B. Jamison, Bethel Park, Pa.
[73] Assignee: Consolidation Coal Company, Pittsburgh, Pa.
[22] Filed: Jan. 3, 1972
[21] Appl. No.: 214,570

[52] U.S. Cl. .................... 350/63, 350/319, 250/239
[51] Int. Cl. .............................................. G02b 7/00
[58] Field of Search ................ 350/63, 319; 351/62; 250/239; 356/207

[56] References Cited
UNITED STATES PATENTS
2,118,716  5/1938  Wager ............................ 356/207 X
2,850,005  9/1958  Good et al. ...................... 350/319 X
3,453,049  7/1969  Wager ............................... 350/63 X
3,469,088  9/1969  Coleman et al. ................... 350/63 X Primary Examiner—David H. Rubin
Attorney—D. Leigh Fowler, Jr. and Stanley J. Price, Jr.

[57] ABSTRACT

A method and apparatus for maintaining the entry or lens of a detecting device, such as a flame detector, free of contaminants that might inhibit the passage of radiation into the detector by maintaining a substantially continuous flow of fluid over the detector lens.

2 Claims, 4 Drawing Figures

PATENTED JUL 10 1973 3,744,873

APPARATUS FOR MAINTAINING DETECTING DEVICES FREE OF CONTAMINANTS

BACKGROUND OF THE INVENTION

1. Field of the Invention

This invention relates to a method and apparatus for contacting and washing the lens of a radiation detecting device, such as a flame detector, with a fluid to maintain the lens free of contaminants tending to destroy the effectiveness of the device by impeding the passage of radiation into the device.

2. Description of the Prior Art

Radiation detecting devices are adapted to measure a preselected type and spectrum of radiant energy, such as the detection of the ultraviolet spectrum by flame detecting devices. Such devices are used frequently in ambient conditions which cause coating of the detector lens with contaminants comprising particulate matter such as dirt, dust or grit or other contaminants such as oil or other fluid films or droplets. Such contaminants render the detector either inoperable or dangerously ineffective because of the action of the contaminant in adsorbing, reflecting or diffracting the radiant energy prior to its entry into the detector.

For example, it has not been practicable heretofore to use flame detectors in underground mines, such as coal mines, because the detector lens quickly becomes covered with dust and oil which render the detector ineffective.

In the prior art, contaminants have been cleaned from detectors by wiping a lens with a cloth or similar device. That method has many disadvantages, such as the necessity of performing the lens cleaning by a human agent susceptible to failure to clean the detector when, or as often as, necessary. In addition, it is difficult to maintain the wiping cloth or other cleaning agent free of the very contaminant desired to be removed from the detector when used in the environment.

SUMMARY OF THE INVENTION

This invention resides in a method and apparatus for maintaining the lens of a detector substantially free from contaminants by directing a stream of cleaning fluid onto the surface of the lens. The apparatus of this invention includes a cleaning conduit integral with the detector for delivery onto the lens of the detector of a stream of cleaning fluid. One embodiment of the apparatus of this invention includes a plurality of lens mounting members which define an enclosed cleaning fluid conduit having apertures for directing streams of cleaning fluid onto the detector lens.

This invention provides a method and apparatus for maintaining substantially continuously free of contaminants the lens of a detector without the necessity of intermittent operation or interference by a human agent by use of a cleaning fluid which is not susceptible to contamination prior to its use in the cleaning process. The cleaning fluid can be maintained in a closed system prior to contacting the lens with the fluid. The apparatus of this invention can be adapted for inclusion in newly constructed detectors and for modification of existing detectors.

DESCRIPTION OF THE PREFERRED EMBODIMENTS

In this description, the term "cleaning fluid" includes simple fluids such as air and water, as well as a combination of fluids such as soft water and a detergent such as one of the conventional sodium soaps.

The term "detector" means any radiation detecting device and in particular those devices adapted for the detection of a particular spectrum of radiant energy, such as flame detectors for the detection of ultraviolet radiation.

The term "lens" means any lens, filter, or other covering permitting the passage of radian energy therethrough.

Figure 1:
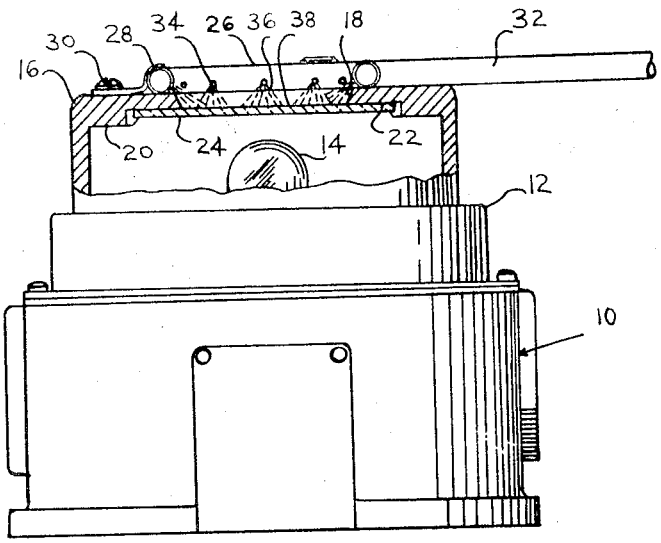
FIG. 1 is a side elevation partially in cross section, of an embodiment of this invention having, attached to a conventional detecting device, apparatus to deliver a plurality of streams of cleaning fluid to the lens of a detector.

In the drawings, FIG. 1 shows an embodiment of the apparatus of this invention suitable either for use in construction of new detecting devices or for modification of existing devices in accordance with this invention. In FIG. 1, the detector, indicated generally by reference numeral 10, includes a housing 12 containing therein radiation detecting apparatus 14.

The upper surface 16 of housing 12 has an opening 18 therethrough into the interior of the detector 10. The inner surface 20 of the top of the device 10 has a recessed portion 22 in which a lens 24 is secured by any suitable securing means, not shown in the drawings.

Figure 2:
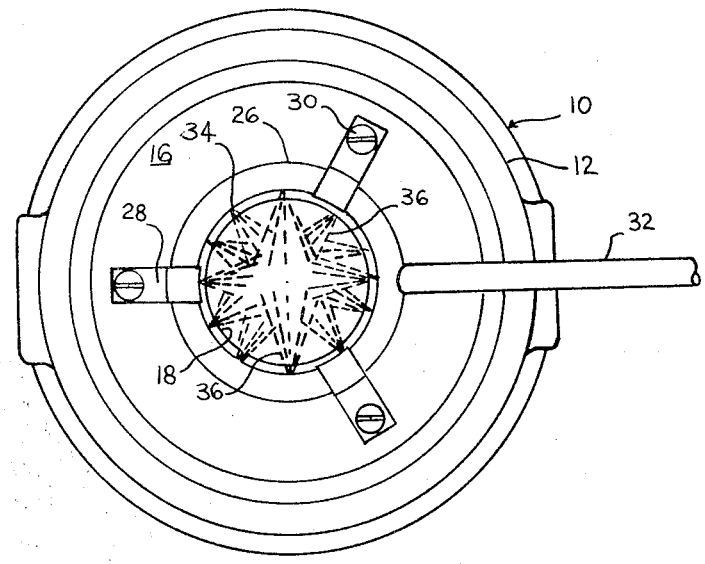
FIG. 2 is a plan view of the device depicted in FIG. 1 and illustrates more clearly one preferred structure for delivering a plurality of cleaning fluid streams to the lens surface.

FIG. 2 depicts a cleaning fluid manifold 26 connected to upper surface 16 of detector 10 by clips 28 and suitable fasteners 30. Manifold 26 can have any suitable configuration adapted to achieve the purpose of this invention and could, therefore, be circular, polygonal, elliptical, or any other suitable shape, such as a straight linear manifold or arcuate manifold, or other shaped manifold, positioned either adjacent to the edge of opening 18 or suspended over some portion of opening 18. Cleaning fluid manifold 26 can have any suitable transverse cross section.

A delivery conduit 32 is connected in fluid communication with cleaning fluid manifold 26 and extends to a reservoir for cleaning fluid (not shown in the drawings). In a preferred embodiment of this invention, the cleaning fluid reservoir, delivery conduit 32 and cleaning fluid manifold 26, comprise a fluid system completely enclosed except for apertures 34 in cleaning fluid manifold 26 constructed and arranged for direction of cleaning fluid onto surface 38 of lens 24.

Apertures 34 can comprise one or a plurality of apertures, evenly or unevenly spaced around cleaning fluid manifold 26 and can have any cross sectional and longitudinal configuration adapted to provide a cleaning fluid stream, or streams, of velocity sufficient to maintain the external surface 38 of lens 24 free of contaminants. In certain applications of this invention, apertures 34 might be fitted with appropriate sleeves, orifices or nozzles adapted to impart additional velocity to the streams of cleaning fluid.

Figure 4:
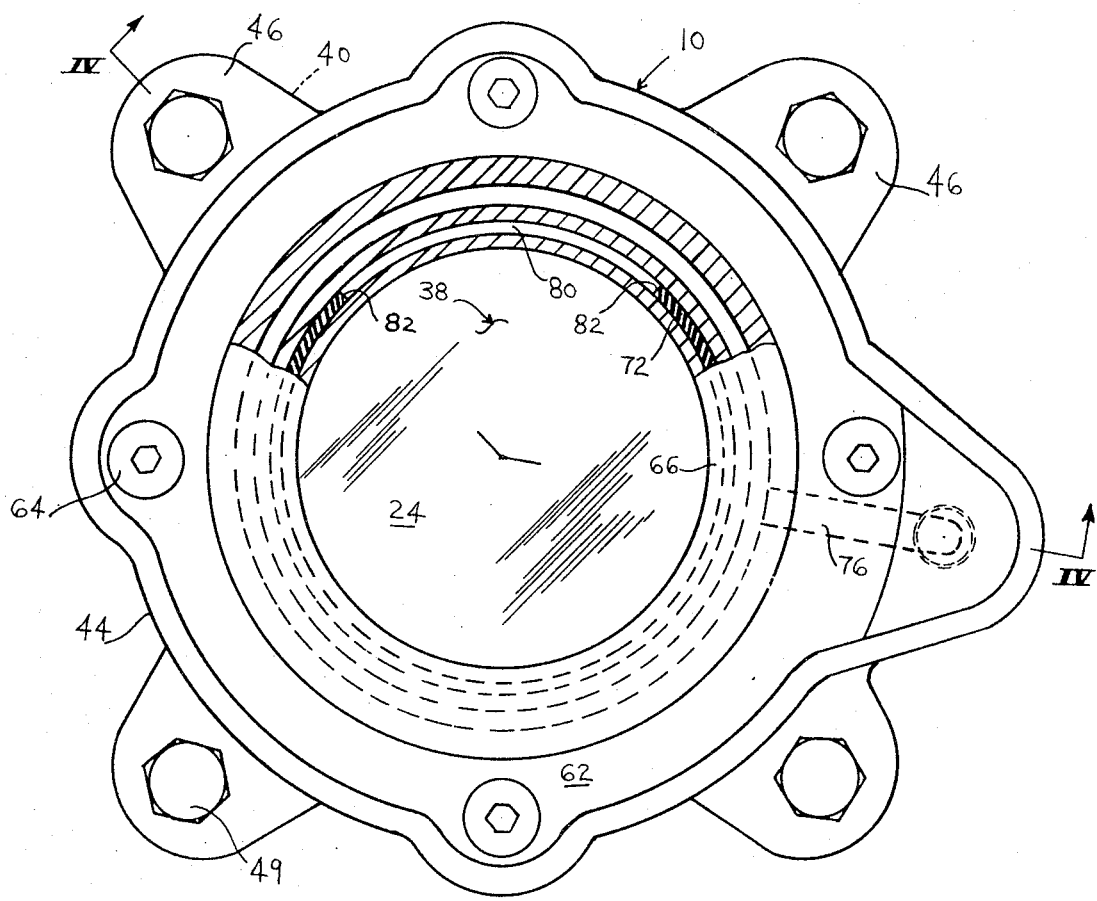
FIG. 4 is a plan view, in partial cross section, of the device shown in FIG. 3 and illustrating more clearly the arrangement of the lens mounting members to provide the desired fluid conduit.
Figure 3:
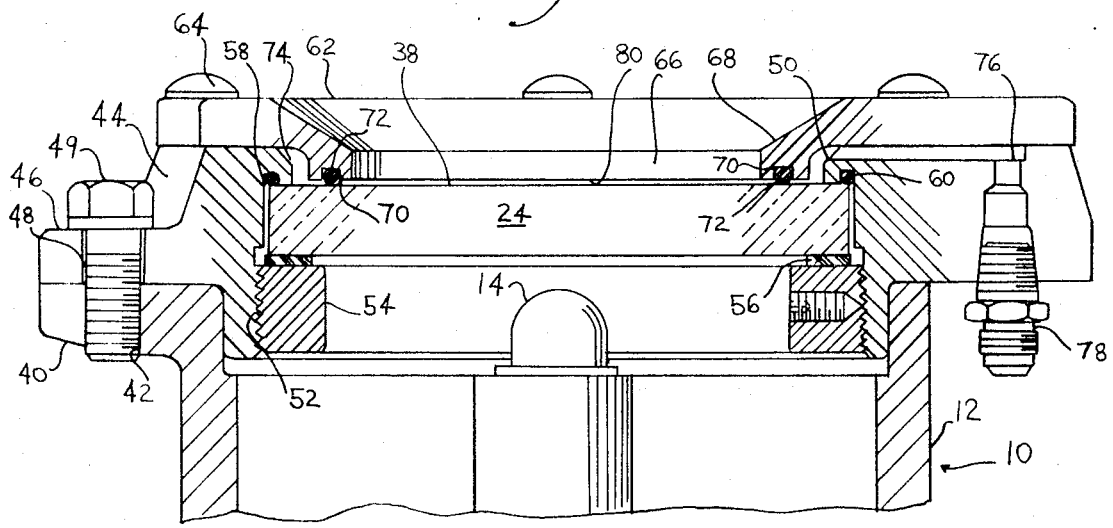
FIG. 3 is a side elevation, partially fragmented and partially in cross section, of another embodiment of this invention having lens mounting means defining a fluid conduit to direct cleaning fluid onto the surface of the lens.

FIGS. 3 and 4 illustrate another preferred embodiment of the apparatus of this invention wherein the cleaning fluid manifold is internal to the structure of the detector. In the description of FIGS. 3 and 4, the same reference numerals used in the description of FIGS. 1 and 2 will be used to describe similar or identical elements of structure common to the two devices.

The detector 10 comprises housing 12 having therein detecting apparatus 14. A plurality of housing lugs 40 extend radially outward from the top of housing 12, each lug 40 having a threaded opening 42 extending therethrough.

A lens ring 44, mounted on top of housing 12, has a plurality of outwardly extending lugs 46. Each lens ring lug 46 has extending therethrough an opening 48 with lens ring lugs 46 and openings 48 constructed and arranged for alignment with housing lugs 40 and threaded openings 42 therein to permit connection of lens ring 44 to housing lugs 40 by suitable fasteners 49.

A bore 50 extends through lens ring 44 which has a lower threaded portion 52. An adjustable seat ring 54 is secured by threads, or other suitable means, within the lower portion 52 in lens ring 44. A washer 56 of soft lead or other suitable material is compressed on top of seat ring 54, subjacent and contiguous to the bottom of lens 24 within lens ring 44. Bore 50 of lens ring 44 is recessed and counter-bored to provide a circular groove 58 in the top of lens ring 44, said circular groove 58 being adapted to receive an O-ring 60 of resilient or other suitable material to provide a fluid tight seal between lens ring 44 and lens 24 in circular groove 58.

A lens top 62 is connected by fasteners 64 or other suitable means to the top of lens ring 44. Lens top 62 has an opening 66 exposing the top surface 38 of lens 24. Lens top 62 has a downwardly extending shoulder 68 around opening 66. A circular groove 70 is provided in the bottom surface of shoulder 68 and is adapted to receive a lens top O-ring 72, of resilient or other suitable material, which supports and maintains the bottom surface of lens top 62 in spaced relation away from the upper surface 38 of lens 24 while providing a fluid tight seal between the bottom surface of lens top 62 and upper surface 38 of lens 24.

As is shown in FIGS. 3 and 4, in assembly, a cleaning fluid cavity 74 is defined by the arrangement among lens ring 44, the bottom surface of lens top 62, O-ring 72, and the upper surface 38 of lens 24. A delivery channel 76 is provided for in lens ring 44 which communicates with cleaning fluid cavity 74 at one end of delivery channel 76 and with suitable nozzle or valve fittings and other means 78 at the other end of delivery channel 76 in communication with an external reservoir of cleaning fluid.

FIG. 4 shows how an aperture 80 for passage of cleaning fluid onto the upper surface 38 of lens 24 is provided in this embodiment of the invention. Aperture 80 is defined by the bottom surface of lens top 62, the upper surface 38 of lens 24 and the adjacent end portions 82 of adjacent O-ring segments 72. A plurality of apertures 80 can be provided in a particular embodiment of this invention by seating in groove 70 a plurality of lens top O-ring segments 72 spaced in circular groove 70 either evenly or unevenly, according to the needs of the particular embodiment. Groove 70 can be round, or polygonal, or any other perimeter configuration suitable for a particular embodiment and, where a plurality of lens top O-ring segments 72 are employed, those segments 72 can be linear, arcuate, or of any other suitable configuration.

The ability to adjust seat ring 54 and lens top 62, and the resiliency of O-ring 60 and lens top O-ring segments 72, provide means whereby one can adjust the total volume in, and rate of fluid flow through, cleaning fluid cavity 74 and can adjust the size of aperture 80 as well as the velocity of cleaning fluid passing therethrough, according to the needs of a particular embodiment of this invention.

In use, the apparatus of this invention is mounted with the lens oriented vertically. In certain particular uses of the apparatus, the detector can be mounted with the lens mounted other than vertically without interfering with the operation of this apparatus.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for maintaining the lens of a detector in use substantially free of contaminants comprising,
    a housing containing the lens and a detecting apparatus,
    lens mounting means including a lens ring integral with the housing and having a downwardly extending shoulder around its upper inner end,
    a seat ring secured within the lower end of the lens ring,
    a washer mounted on top of the seat ring within the lens ring for support of the lens thereof,
    a lens top connected to the lens ring in spaced relation with the external surface of the lens, said lens top having an opening therethrough onto the surface of the lens,
    said lens top having an inwardly and downwardly extending shoulder adjacent the external surface of the lens with a groove extending around said shoulder and facing the external surface of the lens,
    an arcuate sealing member mounted in the groove of the lens top shoulder and secured by the lens top in fluid tight engagement with the external surface of the lens,
    a cleaning fluid cavity defined by the combination of the lens ring, the lens top, the arcuate sealing member, and the external surface of the lens, and
    an aperture in the cleaning fluid cavity, said aperture defined by the shoulder of the lens top, the external surface of the lens, and two adjacent ends of the arcuate sealing member within the lens top shoulder.

2. Apparatus as described in claim 1 wherein a plurality of arcuate sealing members are mounted in spaced relation to each other around the groove in the lens top shoulder and held by the lens top in fluid tight engagement with the external surface of the lens, and having a plurality of apertures adjacent the lens in the fluid cavity, each said aperture being defined by the combination of the external surface of the lens, the lens top shoulder, and two spaced adjacent segments of adjacent arcuate sealing members.

* * * * *